United States Patent

Gormley et al.

[11] Patent Number: 5,859,985
[45] Date of Patent: Jan. 12, 1999

[54] ARBITRATION CONTROLLER FOR PROVIDING ARBITRATION ON A MULTIPOINT HIGH SPEED SERIAL BUS USING DRIVERS HAVING OUTPUT ENABLE PINS

[75] Inventors: Eamonn Gormley, Seattle; James M. Hite, Marysville; Chad A. Pralle, Seattle, all of Wash.

[73] Assignee: AT&T Wireless Services, Inc., Middletown, N.J.

[21] Appl. No.: 824,937

[22] Filed: Mar. 26, 1997

[51] Int. Cl.$^6$ ....................................................... G06F 13/36
[52] U.S. Cl. ........................... 395/287; 395/293; 395/306; 395/309
[58] Field of Search .................................... 395/287–305, 395/306, 309

[56] References Cited

U.S. PATENT DOCUMENTS 5,005,151  4/1991  Kurkowski .
5,276,887  1/1994  Haynie .
5,590,130  12/1996 Krein et al. .
5,611,053  3/1997  Wu et al. .

*Primary Examiner*—Meng-Ai T. An
*Assistant Examiner*—Sumati Lefkowitz
*Attorney, Agent, or Firm*—Jose R. de la Rosa

[57] ABSTRACT

An arbitration controller provides arbitration on a multipoint, high speed serial bus with a plurality of drivers. Each driver includes a data input pin, an output enable pin, and an output pin. The bus defaults to a first state when the output of the plurality of drivers are set to high impedance. The arbitration controller eliminates any unstable output states on the drivers by controlling the input signals on the drivers. The arbitration controller detects when the bus is in an arbitration mode. When this is detected, the arbitration controller inputs data to the output enable pin and inputs an opposite state of the first state to the data input pin. Further, the arbitration controller detects when the bus is in a data mode. When this is detected, the arbitration controller inputs data to the data input pin and inputs a driver control signal to the output enable pin.

18 Claims, 4 Drawing Sheets

ARBITRATION CONTROLLER FOR PROVIDING ARBITRATION ON A MULTIPOINT HIGH SPEED SERIAL BUS USING DRIVERS HAVING OUTPUT ENABLE PINS

BACKGROUND OF THE INVENTION

The present invention is directed to an arbitration controller for providing arbitration on a serial bus. More particularly, the present invention is directed to an arbitration controller for providing arbitration on a multipoint, high speed serial bus using drivers that include an enable pin.

Multipoint serial buses have recently been introduced for interconnecting various computer equipment and other electronic devices. These buses typically allow for much higher data speed than previously known serial buses. One such bus is the Universal Serial Bus (USB), details of which can be found in *Universal Serial Bus Specification Revision* 1.0, Jan. 15, 1996, Copyright 1996, Compaq Computer Corporation, Digital Equipment Corporation, IBM PC Company, Intel Corporation, Microsoft Corporation, NEC, Northern Telecom. The USB has a data transfer rate of up to 12 megabits per second (Mbps). Another recently introduced high speed serial bus is the 1394 serial bus. The 1394 serial bus complies with the Institute of Electrical and Electronic Engineers (IEEE) 1394 standard. The 1394 serial bus has a data transfer rate of up to 400 Mbps and a clock speed of about 50 Mhz.

One problem with these new high speed serial buses is that known ways to provide multipoint arbitration cannot be implemented because of the higher speeds. For example, FIG. 1 illustrates a known method to provide multipoint arbitration on a low speed serial bus. In FIG. 1, three nodes, or drivers, 12, 14, 16 arbitrate for the use of the serial bus 10, where a driver that inputs a "0" on bus 10 wins the arbitration. The output of drivers 12, 14, 16 is solely dependent on the input. The drivers 12, 14, 16 are implemented using transistor-transistor logic (TTL). One example of a TTL driver is the 74F07 driver chip. TTL logic drivers typically include open collector outputs which cause the driver output to provide a high-impedance when its input is "1", or high. A tristated output releases the driver from the bus. Therefore, in the example shown in FIG. 1, node 12 which has an input of "0" wins the arbitration because it drives the bus low. Nodes 14 and 16 have an input of "1" and therefore tristate the bus.

However, with the introduction of higher speed serial buses, open collector output drivers such as drivers 12, 14, 16 can no longer be used. Specifically, when the frequency of the serial bus exceeds approximately 10 Mhz, the capacitance on the bus and the backplane of the device incorporating the bus increases sufficiently so that open collector drivers can no longer drive signals a sufficient distance required for most devices. Therefore, specialized high speed drivers must be used. The typical specialized high speed driver does not utilize open-collector outputs and includes an output enable pin. Examples of these specialized drivers include low voltage differential signaling (LVDS), emitter coupled logic (ECL) and advanced CMOS technology (ABT).

FIG. 2 illustrates an example of a specialized driver. The driver 20 includes an input pin 22, an output pin 24, and a output enable pin 26. A high input on the output enable pin 26 causes output pin 24 to tristate. A low input on output enable pin 26 causes output pin 24 to output the state of input pin 22.

In order to use a plurality of drivers 20 for arbitration on a high speed serial bus, it is desirable for the output of each driver 20, like open collector drivers 12, 14, 16, to be solely dependent on the input of driver 20. One way to achieve this is to tie output enable pin 26 to the inverse of input pin 22. With this arrangement, driver 20 is logically identical to drivers 12, 14, 16. However, we have discovered that there are problems when using this arrangement with a high speed serial data bus. Specifically, with most specialized drivers such as driver 20, the delay from the time output enable pin 26 changes state to the time output pin 24 changes state is different than the delay from the time the data input on input pin 22 changes state to the time output pin 24 changes state. During this time difference there is an unstable output state on output pin 24 which can result in corrupted data on the bus.

Based on the foregoing, there is a need for an arbitration controller that provides arbitration on a multipoint, high speed serial bus using drivers that include an output enable pin, where the controller eliminates any unstable output state on the drivers.

SUMMARY OF THE INVENTION

The present invention is an arbitration controller that provides arbitration on a multipoint, high speed serial bus with a plurality of drivers. Each driver includes a data input pin, an output enable pin, and an output pin. The bus defaults to a first state when the output of the plurality of drivers are set to high impedance. The arbitration controller eliminates any unstable output states on the drivers by controlling the input signals on the drivers.

The arbitration controller detects when the bus is in an arbitration mode. When this is detected, the arbitration controller inputs data to the output enable pin and inputs an opposite state of the first state to the data input pin. Further, the arbitration controller detects when the bus is in a data mode. When this is detected, the present invention inputs data to the data input pin and inputs a driver control signal to the output enable pin.

DETAILED DESCRIPTION

The present invention will be described in connection with an exemplary high speed serial bus system that includes a high speed bus, a bus interface controller and a specialized driver. The present invention is an arbitration controller that interfaces with the high speed serial bus system.

Figure 1:
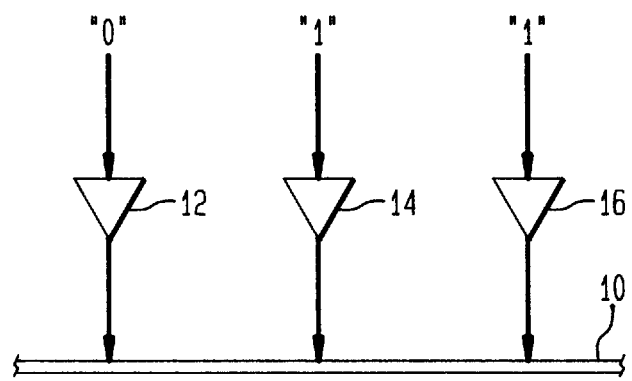
FIG. 1 illustrates a known method to provide multipoint arbitration on a low speed serial bus.
Figure 2:
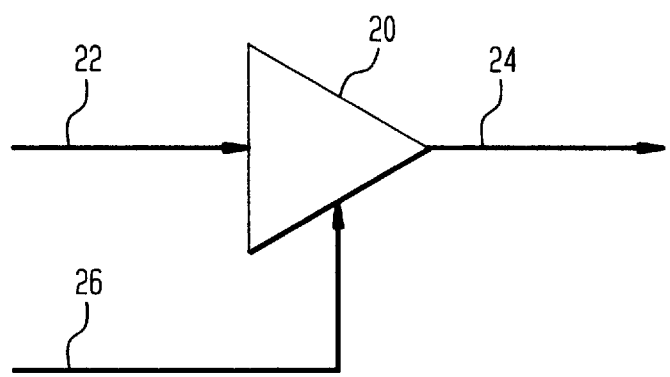
FIG. 2 illustrates an example of a specialized driver.
Figure 3:
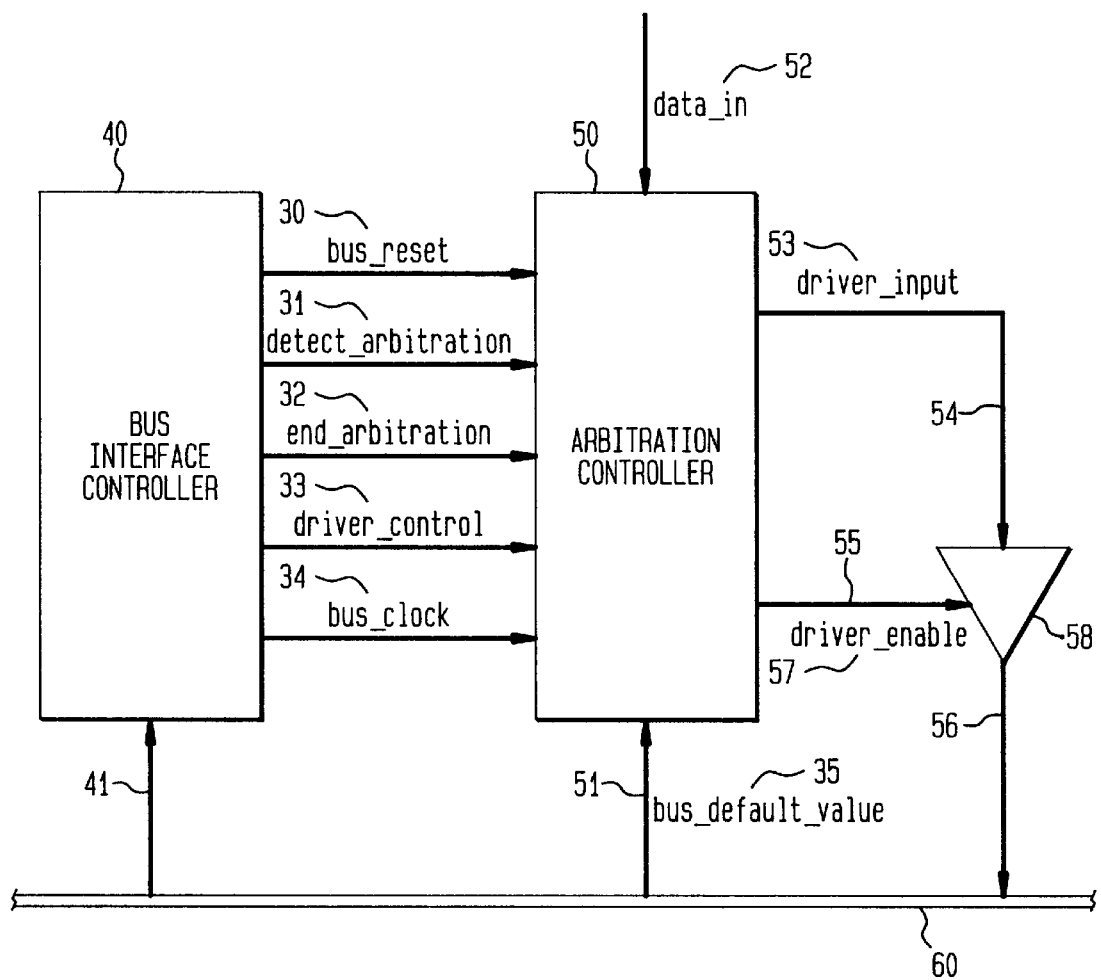
FIG. 3 is a block diagram of an exemplary high speed serial bus system that includes the present invention.

FIG. 3 is a block diagram of the exemplary high speed serial bus system that includes the present invention. The system includes a high speed serial bus 60, a bus interface controller 40 coupled to bus 60, an arbitration controller 50 coupled to bus interface controller 40 and bus 60, and a driver 58 coupled to bus 60 and arbitration controller 50. For illustration purposes, only one driver is shown coupled to bus 60 in FIG. 3. However, bus 60 is a multipoint bus, and in one embodiment multiple drivers and receivers are coupled to bus 60.

Bus interface controller 40 has an input 41 from bus 60. Further, bus interface controller 40 generates and outputs at least five signals that are input to arbitration controller 50. Bus_reset signal 30 is a master reset signal for bus 60. Detect_arbitration signal 31 is a signal to indicate that bus 60 is in arbitration mode. End_arbitration signal 32 is a signal that indicates that bus 60 is not in arbitration mode (i.e., bus 60 is in data mode). Driver_control signal 33 is the driver output enable control signal for driver 58. Finally, bus_clock signal 34 is the bus 60 clock signal.

Arbitration controller 50, in addition to receiving the previously described signals from bus interface controller 40, also receives a data_in signal 52 that is data that is intended to be placed on bus 60 through driver 58. Arbitration controller 50 also receives input at line 51 from bus 60. One signal received on line 51 from bus 60 is bus_default_value signal 35. Bus_default_value signal 35 can also be received from another device, such as from bus interface controller 40, or it can be internally generated because it is a constant value. Bus_default_value signal 35 is the value of bus 60 when all drivers coupled to bus 60 are in tristate mode (i.e., all drivers are disconnected from bus 60). In one embodiment, this value is a logical 1 or high because bus 60 is pulled up to a high state when no drivers are driving data on it.

Driver 58 receives a driver_input signal 53 from arbitration controller 50 on line 54, and a driver_enable signal 57 from arbitration controller 50 on line 55. Line 54 is coupled to the input pin of driver 58 and line 55 is coupled to the output enable pin of driver 58. Driver 58's output pin is coupled to bus 60 through line 56.

In one embodiment, bus 60 is an IEEE 1394 serial bus. In this embodiment, bus interface controller 40 is comprised of a 1394 backplane transceiver/arbiter and a 1394 serial bus link-layer controller. One example of the transceiver/arbiter is the TSB14C01 transceiver/arbiter from Texas Instruments Inc. One example of the link layer controller is the TSB12C01A, also from Texas Instruments Inc. In one embodiment of the present invention, driver 58 is an LVDS high speed driver. One example of an LVDS driver is the DS36C200 driver from National Semiconductor Corp.

Arbitration controller 50 is a state machine that provides outputs to driver 58 based on various inputs. The functionality of arbitration controller 50, referred to as controller logic, can be implemented using either hardware or software, or a combination of each. When implemented in software, arbitration controller 50 includes a storage device for storing the software instructions and a processor for executing the instructions.

Figure 4:
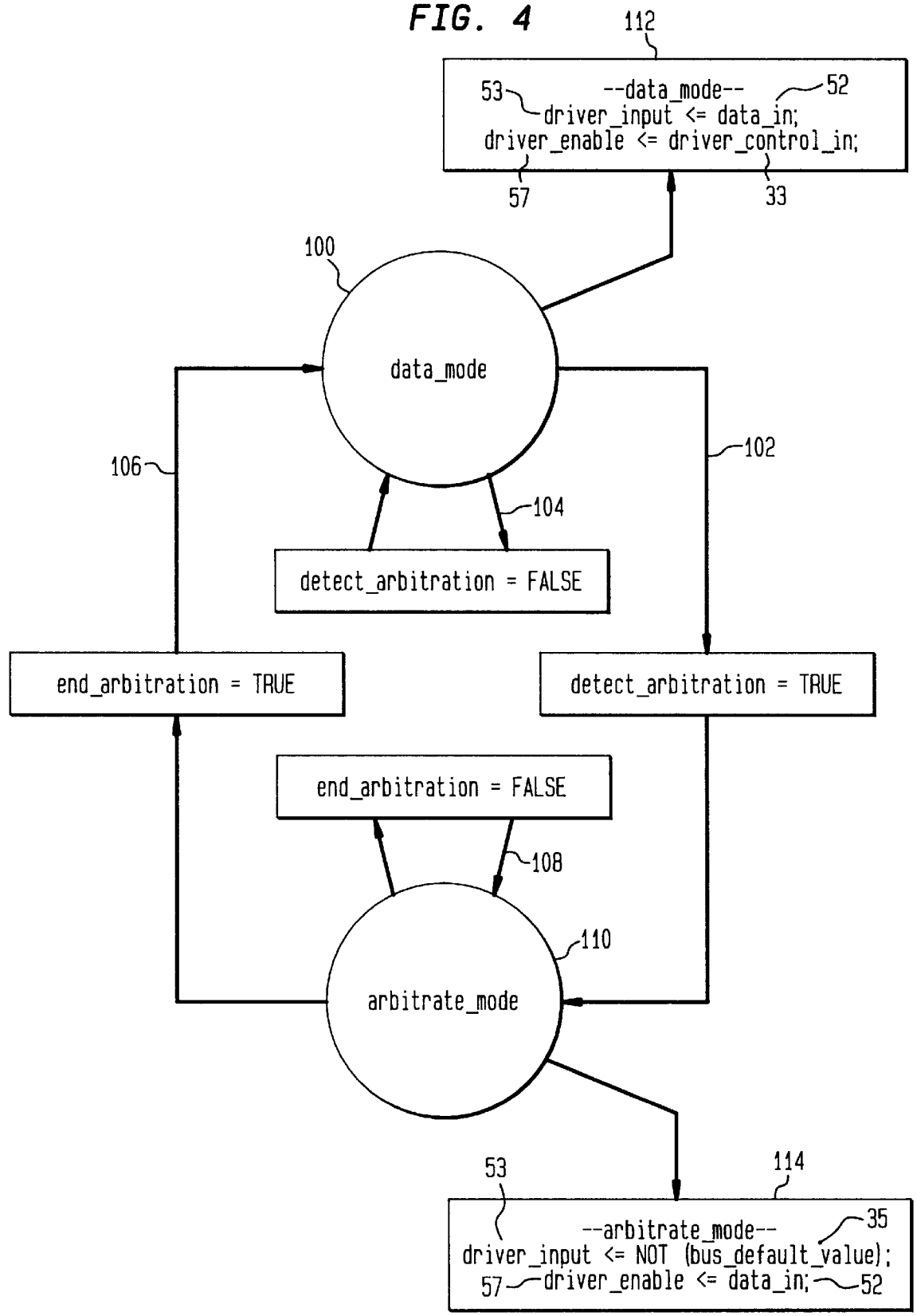
FIG. 4 is a state diagram illustrating the functionality of the present invention.

FIG. 4 is a state diagram illustrating the functionality of arbitration controller 50. Arbitration controller 50 includes two states: data_mode 100 and arbitrate_mode 110. As shown in box 112, when arbitration controller 50 is in the data_mode 100 state, data_in signal 52 equals driver_input signal 53. Therefore, data_in signal 52 is input to the data pin of driver 58 through line 54 shown in FIG. 3. In addition, when arbitration controller 50 is in the data_mode 100 state, driver_control signal 33 equals driver_enable signal 57. Therefore, driver_control signal 33 is input to the output enable pin of driver 58 through line 55 shown in FIG. 3.

As further shown in FIG. 4, while in data_mode 100 state, arbitration controller 50 monitors detect_arbitration signal 31. If it is true, which indicates that bus 60 is in arbitration mode, arbitration controller 50 switches states to arbitrate_mode 110 via path 102. If detect_arbitration signal 31 is false, arbitration controller 50 remains in data_mode 100 state via path 104.

As shown in box 114 of FIG. 4, when arbitration controller 50 is in arbitrate_mode 110, the inverse of bus_default_value signal 35 equals driver_input signal 53. Therefore, the inverse of bus_default_value signal 35 is input to the data pin of driver 58 through line 54 shown in FIG. 3. In addition, when arbitration controller 50 is in the arbitrate_mode 110 state, data_in signal 52 equals driver_enable signal 57. Therefore, data_in signal 52 is input to the output enable pin of driver 58 through line 55 shown in FIG. 3.

As further shown in FIG. 4, while in arbitrate_mode 110 state, arbitration controller 50 monitors end_arbitration signal 32. If it is true, which indicates that bus 60 is no longer in arbitration mode, arbitration controller 50 switches states to data_mode 100 via path 106. If end_arbitration signal 32 is false, arbitration controller 50 remains in arbitrate_mode 100 state via path 108.

Arbitration controller 50 eliminates the unstable output state on driver 58 because in driver 58 the output-enable-active-data-valid delay is much higher than the propagation delay in the device. Setting the data rate during arbitration mode of bus 60 at a much slower rate than the during data mode prevents the extra delay from causing a problem. During data mode the output enable is constantly enabled on the winning driver thus ending the unstable data condition.

Figure 5:
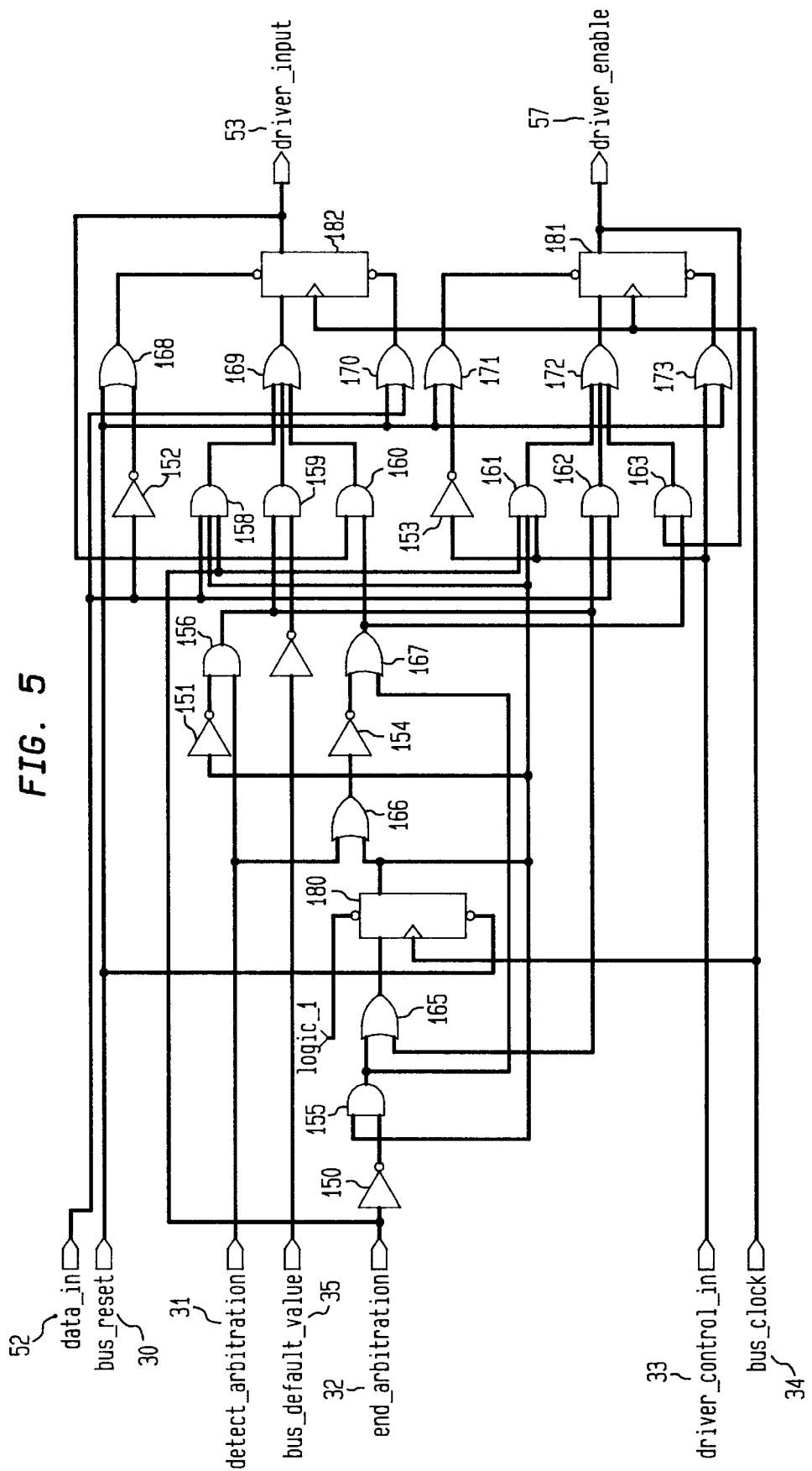
FIG. 5 illustrates a hardware implementation of one embodiment of the present invention.

FIG. 5 illustrates a hardware implementation of one embodiment of arbitration controller 50. The arbitration controller 50 includes inverters 150–154, AND gates 155–163, OR gates 165–173 and D-type flip-flops 180–182. Signals previously described in conjunction with FIG. 3 are input on the left side of arbitration controller 50 illustrated in FIG. 5, and are output on the right side. The functionality of arbitration controller 50 can also be implemented using many different combinations of logic circuitry than illustrated in FIG. 5.

As described, the present invention is an arbitration controller that interfaces with the high speed serial bus system. The arbitration controller, when coupled to a driver, eliminates all unstable output states on the driver.

Various embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of interfacing with a first driver to provide arbitration on a multipoint, high speed serial bus coupled to a plurality of drivers, wherein the first driver includes a data input pin, an output enable pin, and an output pin, and wherein the bus defaults to a first state when the output of each driver coupled to the bus is set to high impedance, comprising the steps of:

a) detecting when the bus is in an arbitration mode;

b) inputting data to the output enable pin when the bus is detected to be in the arbitration mode; and c) inputting an opposite state of the first state to the data input pin when the bus is detected to be in the arbitration mode.

2. The method of claim 1, further comprising the steps of:

d) detecting when the bus is in a data mode;

e) inputting data to the data input pin when the bus is detected to be in the data mode; and f) inputting a driver control signal to the output enable pin when the bus is detected to be in the data mode.

3. The method of claim 2, wherein the serial bus complies with the Institute of Electrical and Electronic Engineers (IEEE) 1394 standard.

4. The method of claim 2, wherein the first driver is a low voltage differential signaling driver.

5. The method of claim 2, wherein the first state is a logical 1.

6. An arbitration controller for providing arbitration on a multipoint high speed serial bus coupled to a plurality of drivers, wherein said arbitration controller is coupled to a bus interface controller and the bus, and wherein the bus defaults to a first state when the output of each driver coupled to the bus is set to high impedance, said arbitration controller comprising:

an input adapted to receive data;

a first output coupled to a data input pin of a first driver; and a second output coupled to an output enable pin of said first driver;

controller logic that, when the bus is in arbitration mode, sends said data to said second output and sends an opposite state of said first state to said first output.

7. The arbitration controller of claim 6, wherein said controller logic, when the bus is in data mode, sends said data to said first output and sends a driver control signal received from said bus interface controller to said second output.

8. The arbitration controller of claim 7, wherein said controller logic defines a state machine.

9. The arbitration controller of claim 7, wherein the bus complies with the Institute of Electrical and Electronic Engineers (IEEE) 1394 standard.

10. The arbitration controller of claim 7, wherein said first driver is a low voltage differential signaling driver.

11. The arbitration controller of claim 7, wherein said first state is a logical 1.

12. The arbitration controller of claim 7, wherein said controller logic comprises software instructions.

13. The arbitration controller of claim 7, wherein said controller logic comprises:

an inverter;

a flip-flop;

an OR gate; and an AND gate.

14. An arbitration controller interfaced with a first driver for providing arbitration on a multipoint, high speed serial bus coupled to a plurality of drivers, wherein the first driver includes a data input pin, an output enable pin, and an output pin, and wherein the bus defaults to a first state when the output of each driver coupled to the bus is set to high impedance, said arbitration controller comprising:

means for detecting when the bus is in an arbitration mode;

means for inputting data to the output enable pin when the bus is in the arbitration mode; and means for inputting an opposite state of the first state to the data input pin when the bus is in the arbitration mode.

15. The arbitration controller of claim 14, further comprising:

means for detecting when the bus is in a data mode;

means for inputting data to the data input pin when the bus is in the data mode; and means for inputting a driver control signal to the output enable pin when the bus is in the data mode.

16. The arbitration controller of claim 15, wherein the serial bus complies with the Institute of Electrical and Electronic Engineers (IEEE) 1394 standard.

17. The arbitration controller of claim 15, wherein the first driver is a low voltage differential signaling driver.

18. The arbitration controller of claim 15, wherein the first state is a logical 1.

* * * * *